(12) United States Patent
Tseng

(10) Patent No.: US 10,299,320 B2
(45) Date of Patent: May 21, 2019

(54) LIGHT EMITTING MODULE THEREOF

(71) Applicant: Shen-Ko Tseng, Taipei Hsein (TW)

(72) Inventor: Shen-Ko Tseng, Taipei Hsein (TW)

( * ) Notice: Subject to any disclaimer, the term of this patent is extended or adjusted under 35 U.S.C. 154(b) by 0 days.

(21) Appl. No.: 14/338,300

(22) Filed: Jul. 22, 2014

(65) Prior Publication Data

US 2015/0028773 A1    Jan. 29, 2015

(30) Foreign Application Priority Data

Jul. 29, 2013  (CN) .................... 2013 2 0455849 U

(51) Int. Cl.
*H05B 37/00* (2006.01)
*H05B 33/08* (2006.01)

(52) U.S. Cl.
CPC ........ *H05B 33/0806* (2013.01); *Y02B 20/342* (2013.01)

(58) Field of Classification Search
CPC .......................... H05B 37/02; H05B 37/0227; H05B 33/0827; H05B 33/0815; H05B 33/0818; H05B 41/2828; H05B 41/3921; H05B 41/3927; H05B 37/029; H05B 33/0803; H05B 37/0254; H05B 41/28; H05B 33/0821; H05B 33/0809; F21Y 2101/02; F21Y 2113/005; Y10S 362/80; G01R 31/3336; G03B 15/0452; G05D 25/02; H01H 9/0066; F21S 4/001
USPC .............................. 315/185 R–193, 291–307
See application file for complete search history.

(56) References Cited

U.S. PATENT DOCUMENTS

| | | | | |
|---|---|---|---|---|
| 5,813,148 A * | 9/1998 | Guerra | ................. | A43B 1/0036 36/137 |
| 6,345,238 B1 * | 2/2002 | Goodwin | ................. | G01K 7/10 257/470 |
| 2008/0180941 A1 * | 7/2008 | Tuan | ..................... | A41D 27/085 362/103 |
| 2009/0039792 A1 * | 2/2009 | Yang | ..................... | G09G 3/2927 315/169.4 |
| 2010/0109537 A1 * | 5/2010 | Nishino | ............. | H05B 33/0827 315/185 R |
| 2011/0221353 A1 * | 9/2011 | Tseng | ................. | H05B 37/0227 315/217 |
| 2011/0298393 A1 * | 12/2011 | Chew | ................. | H05B 33/0803 315/294 |

(Continued)

*Primary Examiner* — Minh D A
(74) *Attorney, Agent, or Firm* — Klintworth & Rozenblat IP LLP

(57) ABSTRACT

The present invention discloses a light-emitting module using a special circuit design to solve the abnormal breakage of the battery lifetime and comprising a power supply module storing an electrical power; a first sub-circuit and a second sub-circuit, the first sub-circuit comprising a first light-emitting diode module, the second sub-circuit comprising a second light-emitting diode module and a passive component, wherein the passive component is connected with the second light-emitting diode module in series, the lighting color of the first light-emitting module is different from the lighting color of the second light-emitting diode module; and a control module coupled to the power supply module, the first sub-circuit, and the second sub-circuit, for supplying the electrical power with the first sub-circuit and the second sub-circuit and driving the first light-emitting diode module and the second light-emitting diode module to emit light.

7 Claims, 3 Drawing Sheets

(56) References Cited

U.S. PATENT DOCUMENTS

| | | | | |
|---|---|---|---|---|
| 2011/0308114 A1* | 12/2011 | Guzman | ................ | A43B 3/001 |
| | | | | 36/137 |
| 2012/0146519 A1* | 6/2012 | Briggs | ............... | H05B 33/0818 |
| | | | | 315/192 |
| 2013/0049610 A1* | 2/2013 | Chen | ...................... | G08B 15/00 |
| | | | | 315/159 |

* cited by examiner

LIGHT EMITTING MODULE THEREOF

BACKGROUND OF THE INVENTION

1. Field of the Invention

The present creation relates to a light-emitting module, more particularly, to a light-emitting module using a special circuit design to solve the abnormal breakage for battery lifetime.

2. Description of the Prior Art

The present creation relates to a light-emitting module with function of energy saving. Light-emitting diodes can be embedded on the surface of the shoe to flash with various colors. When wearing the shoe, the shoe is treaded by a user for starting a pressure sensing switch in a control module to turn on the power and drive the light-emitting module to light.

In order to achieve the above mentioned functions, the conventional light-emitting modules mostly contain a battery, a controller, and a plurality of light-emitting diodes emitting with different colors. In the assembly completed state, the battery will be controlled by the controller to supply each light-emitting diode module for making light-emitting diodes to emit light. In the practical application, these light-emitting diodes are mostly mixed with light-emitting diode chips having a variety of different colors for simultaneously or sequentially emitting light with a variety of different colors, which can be utilized for alert or decoration purposes.

The existing flashing shoes hide some drawbacks. More particularly, during durability testing, the energy consumption rate of the battery is much higher than its theoretical value while the light-emitting diode module comprises different threshold voltages. In some cases, the durability of the battery is even less than one-tenth of its theoretical lifetime. Specifically, the electrical conditions of light-emitting diodes having different colors are not the same with the conventional flash shoe, e.g., the voltage drop of a red semiconductor chip is about between 1.8V and 2.2V, and the voltage drop of a blue semiconductor chip is about between 2.8V and 3.2V. If the blue chips and the red chips are separately and directly connected with the battery for supplying the electrical power, and then the battery lifetime will result in abnormality and fast loss due to voltage quickly switching, that is also the main reason for the above mentioned problems.

Accordingly, the inventor provides an innovative and effective circuit to overcome the above mentioned problems. Briefly, a passive component is utilized to balance the voltage drop of each LED chip circuit by the inventor, and thus the problem of the unbalanced voltage drop resulting in the abnormal breakage of the battery lifetime can be slowed down.

SUMMARY OF THE INVENTION

The invention aims to provide a light-emitting module with simple structure, it can balance the voltage drop of each light-emitting diode chip circuit, and thus slow down the problem of the unbalanced voltage drop resulting in the abnormal breakage of the battery lifetime.

To achieve the above mentioned purpose, the present invention discloses a light-emitting module comprising a power supply module, a first sub-circuit and a second sub-circuit, and a control module.

The power supply module stores an electrical power.

The first sub-circuit comprises a first light-emitting diode module. The second sub-circuit comprises a second light-emitting diode module and a passive component. Wherein the passive component is connected with the second light-emitting diode module in series, the lighting color of the first light-emitting diode module is different from the lighting color of the second light-emitting diode module.

The control module is coupled to the power supply module, the first sub-circuit, and the second sub-circuit, for supplying the electrical power with the first sub-circuit and the second sub-circuit and driving the first light-emitting diode module and the second light-emitting diode module to emit light.

Additionally, the invention further comprises a dynamic sensing module. The dynamic sensing module is coupled to the control module. The dynamic sensing module is applied by an external force for generating a start signal so that the control module can drive the first light-emitting diode module and the second light-emitting diode module to emit light.

Additionally, the passive component is a diode.

Additionally, the passive component is a resistance.

Additionally, the invention further comprises a fourth sub-circuit. The fourth sub-circuit is connected with the second sub-circuit in parallel and comprises. The fourth sub-circuit comprises a fourth light-emitting diode module and a passive component connected with the fourth light-emitting diode module in series, wherein the passive component connected with the second light-emitting diode module and the passive component connected with the fourth light-emitting diode module are a diode respectively.

Additionally, the voltage drop of the first light-emitting diode module is between 2.8V and 3.2V, the voltage drop of the second light-emitting diode module is between 1.8V and 2.2V, the passive component is a diode, and the forward bias of the diode is between 1V and 1.1V.

Additionally, the corresponding wavelength of the first light-emitting diode module is between 400 nm and 520 nm, the corresponding wavelength of the second light-emitting diode module is between 620 nm and 750 nm, and the passive component is a diode.

Additionally, the power supply module is a lithium battery.

The present invention further discloses a light-emitting module comprising a power supply module, a first sub-circuit and a second sub-circuit, a control module, and a dynamic sensing module.

The power supply module stores an electrical power.

The first sub-circuit comprises a first light-emitting diode module. The second sub-circuit comprises a second light-emitting diode module and a passive component.

The control module is coupled to the power supply module, the first sub-circuit and the second sub-circuit, for supplying the electrical power with the first sub-circuit and the second sub-circuit and driving the first light-emitting diode module and the second light-emitting diode module to emit light.

The dynamic sensing module is coupled to the control module. The dynamic sensing module is applied by an external force for generating a start signal so that the control module can drive the first light-emitting diode module and the second light-emitting diode module to emit light.

Wherein one end of the first sub-circuit and one end of the second sub-circuit are respectively connected with the control module, and the other end of the first sub-circuit is connected with the other end of the second sub-circuit, a difference value is defined between the voltage drop of the first sub-circuit and the voltage drop of the second sub-circuit, and the ratio between the difference value and the voltage drop of the first sub-circuit is smaller than 15%.

Additionally, the passive component is a diode.

The invention is an innovative and effective circuit to overcome the problem of the unbalanced voltage drop resulting in the abnormal breakage of the battery lifetime, and utilizes a passive component to balance the voltage drop of each LED chip circuit. The advantages and spirits of the present invention can be further understood by the following description of the invention and the appended drawings.

BRIEF DESCRIPTION OF THE APPENDED DRAWINGS

DETAILED DESCRIPTION OF THE INVENTION

Figure 1:
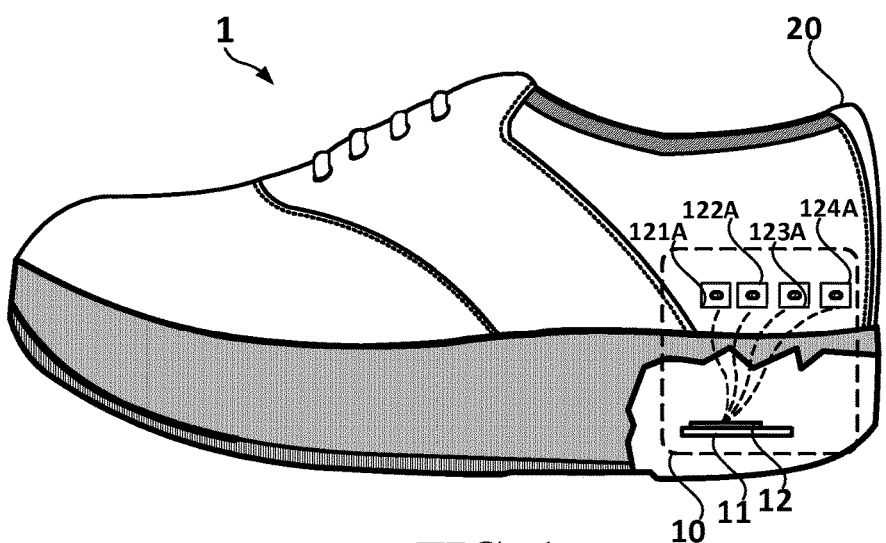
FIG. 1 is a schematic diagram illustrating an automatic light-emitting shoe according to a preferred embodiment of the present invention.

Please refer to FIG. 1. FIG. 1 illustrates a schematic diagram of a light-emitting shoe. As shown in the figure, the light-emitting shoe 1 comprises a shoe body 20 and a light-emitting module 10. In the present embodiment, the light-emitting module 10 is set on the outer surface of the shoe body 20 for others to recognize, but is not limited thereto. In practical applications, the light-emitting module 10 can be set on any of surfaces of the shoe body 20 for exposing its each light-emitting diode on any one positions of the outer surface of the shoe body 20, such as the side surface, after-body, or site fixing shoelaces of the shoe body 20, and the present invention is not limited to the embodiment described herein.

Figure 2:
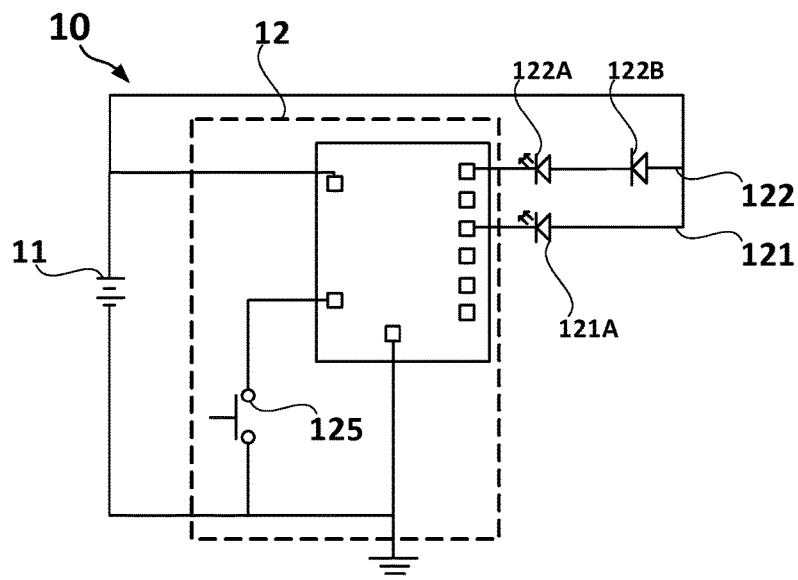
FIG. 2 is a circuit diagram illustrating the light-emitting module of the present invention according to a preferred embodiment.

The design of the light-emitting module 10 will be explained in the following description. Please refer to FIG. 2. FIG. 2 is a circuit diagram illustrating the light-emitting module 10 of the present invention according to a preferred embodiment. As shown in the figure, the light-emitting module 10 of the present invention at least comprises a power supply module 11 and a control module 12.

The power supply module 11 of the present invention is used for supplying the electrical power with each component of the present invention. In the present embodiment, the power supply module 11 refers to a battery, more particularly, the power supply module 11 comprises one or more lithium batteries with about 3V DC output voltage. But not limited thereto, in practical applications, the power supply module 11 may also refer to other types of the batteries or electrical power generating components such as a piezoelectric material or a power generation component of the electromotive force.

On the other hand, the control module 12 of the present invention is used for controlling each component. In the present embodiment, the control module 12 is connected with the power supply module 11. Additionally the control module 12 is connected with a first sub-circuit 121 and a second sub-circuit 122. Wherein, one end of the first sub-circuit 121 and one end of the second sub-circuit 122 are respectively connected with the control module 12, and the other end of the first sub-circuit 121 is connected with the other end of the second sub-circuit 122. The first sub-circuit 121 and one end of the second sub-circuit 122 have a light-emitting diode module separately, but the voltage drop of the light-emitting diode module of the first sub-circuit 121 is higher than the voltage drop of the light-emitting diode module of the second sub-circuit 122. For balance the difference between them, a passive component 122B is set in the second sub-circuit 122 for balancing the voltage drop between each sub-circuit to ease the problem of the efficiency rapid declining of the power supply module 11 due to the different value of the voltage drop.

An embodiment will be explained in the following description. In the present embodiment, the first sub-circuit 121 comprises a first light-emitting diode module 121A. The first light-emitting diode module 121A comprises a first light-emitting diode chip. In the present embodiment, the first light-emitting diode module 121A is a bullet-type light-emitting diode module after packaged, which has a reflecting cup structure, wherein the reflecting cup structure is set by a blue light-emitting diode chip with a wavelength between about 400 nm and 520 nm. On the other hand, the voltage drop of the first light-emitting diode module 121A is between about 2.8V and 3.2V.

On the other hand, the corresponding second sub-circuit 122 comprises a second light-emitting diode module 122A and a passive component 122B connected with the second light-emitting diode module in series. In the present embodiment, the second light-emitting diode module 122A is a bullet-type light-emitting diode module after packaged, which has a reflecting cup structure, wherein the reflecting cup structure is set by a red light-emitting diode chip with a wavelength between about 620 nm and 750 nm. On the other hand, the voltage drop of the second light-emitting diode module 122A is between about 1.8V and 2.2V. Additionally, the passive component 122B is a diode. The maximum power dissipation of the diode is 500 mW. The forward voltage drop (VF) of the diode is 1V while the forward current of the diode is 10 mA, and the forward voltage drop of the diode is 1.1V while the forward current of the diode is 100 mA, but the passive component 122B of the present invention is not limited thereto, in practical application, the passive component 122B may be a resistance or any other components for generating the voltage drop. And the fourth sub-circuit 124 corresponds to the second sub-circuit 122.

Take this design, the voltage drop of the first sub-circuit 121 and the voltage drop of the second sub-circuit 122 are substantially the same value, namely the voltage drop of the first light-emitting diode module 121A and the sum of the voltage drops between the second light-emitting diode module 122A and the passive component 122B connected with the second light-emitting diode module in series are substantially the same value. It should be noted that, in the spirit of the invention, the passive component 122B is used for reducing the difference of voltage drop between the first light-emitting diode module 121A and the second light-emitting diode module 122A, so as to increase the stability of the battery when supplying the electrical power and further extending the lifetime of the battery. Because the voltage and the current of the electronic component is not a fixed value, so in the practical application, the above mentioned word of "substantially the same" is to be understood as that the sum of the voltage drops between the second light-emitting diode module 122A and its passive component 122B is within the range of 85% voltage drop of the first light-emitting diode module 121A. For example, if a standard value (take the highest value as standard) is 1, then while another value is greater than or equal to 0.85, both of which may be regarded as substantially the same.

While in application, a start signal is received by the control module 12 to make the power supply module 11 simultaneously or sequentially supply the electrical power with the first sub-circuit 121 and the second sub-circuit 122 for driving the first light-emitting diode module 121A and the second light-emitting diode module 122A to emit light. In the present embodiment, the start signal is generated by a dynamic sensing module 125. The dynamic sensing module 125 is connected with the control module 12, and applied by an external force or accelerated velocity for generating the start signal, such as a spring switch or a three-axis acceleration sensor. Additionally, in the present embodiment, one end of the dynamic sensing module 125, one end of the dynamic sensing module 125, and grounding end of the control module 12, three of them are together connected with the ground. But the invention for generating the start signal is not limited to the dynamic sensing module 125, the start signal may be generated by a manual pressing switch, a manual rotary switch, a manual toggle switch, or an automatic pressure-sensitive switch according to the different design, the present invention would not pay more restrictions on it. With a mention that start signal is not limited to an electronic signal, which may also use the mechanical theory to complete the circuit switching behavior.

Figure 3:
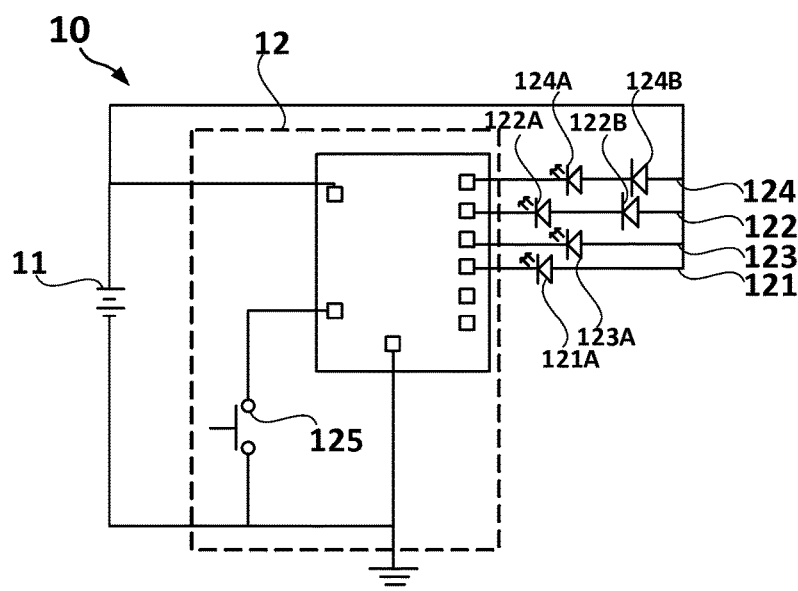
FIG. 3 is a circuit diagram illustrating the light-emitting module of the present invention according to another preferred embodiment.
Figure 4:
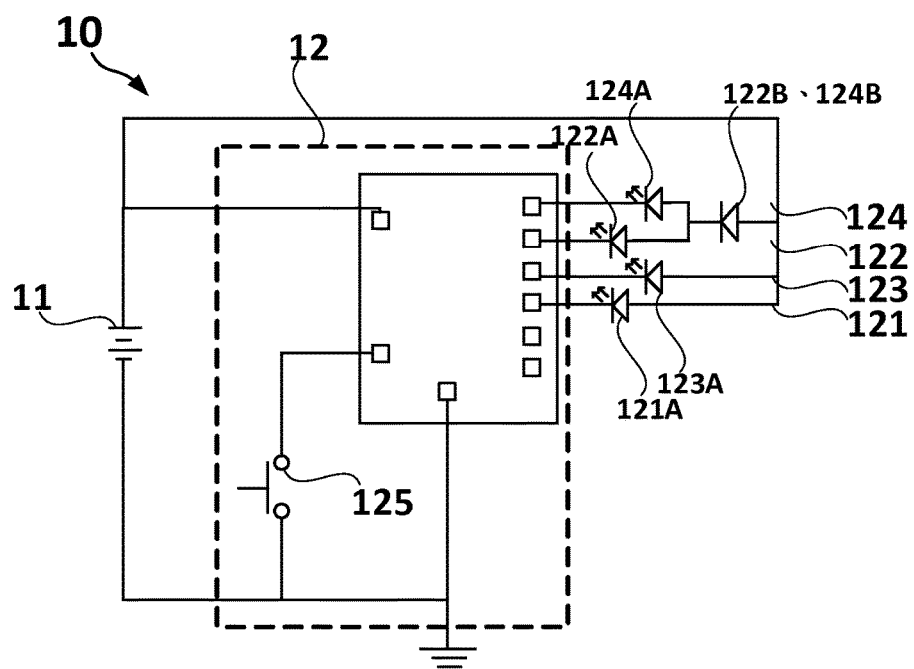
FIG. 4 is a circuit diagram illustrating the light-emitting module of the present invention according to another preferred embodiment.

On the other hand, in addition, the present invention may be achieved in another way. Please refer to FIG. 3. FIG. 3 is a circuit diagram illustrating the light-emitting module 10 of the present invention according to another preferred embodiment. As shown in the figure, a mother circuit of the control module 12 comprises the first sub-circuit 121 and the second sub-circuit 122 besides further comprising a third sub-circuit 123 and a fourth sub-circuit 124, and the above mentioned circuits are substantially connected with each other in parallel, such that the type of the emitting light is more changeable. In order to save cost, the design of the FIG. 4 may be used by users in the invention when the second light-emitting diode module 122A and the fourth light-emitting diode module 124A are substantially the same, such as both of them using the red light-emitting diode, or one using the orange light-emitting diode and the other one using the yellow light-emitting diode. As shown in the figure, in the present embodiment, the design of the third sub-circuit 123 and the design of the first sub-circuit 121 are substantially the same, and the third sub-circuit 123 has a third light-emitting diode module 123A, and the electronic characteristic of the third light-emitting diode module 123A and the electronic characteristic of the first light-emitting diode module 121A are substantially the same, such as both of them using the blue light-emitting diode, or one using the green light-emitting diode and the other one using the blue light-emitting diode, so it is not repeated here. And the fourth sub-circuit 124 corresponds to the second sub-circuit 122, it should be noted that the fourth sub-circuit 124 is connected with the second sub-circuit 122 in series for sharing the same passive component, and the fourth light-emitting diode module 124A of the fourth sub-circuit 124 is connected with the second light-emitting diode module 122A of the second sub-circuit 122 in parallel.

Overall, the inventor provides an innovative and effective circuit, which may overcome the problem of battery lifetime abnormality losing caused by unbalanced voltage drop. Briefly, the invention utilizes a passive component to balance the voltage drop of each light-emitting diode chip circuit, and thus slow down the above mentioned problem.

Before further explaining the present invention, finally, needs to known that the above mentioned contents in the present specification is just one of many examples belonging to the present invention. Any methods or means similar or equivalent to the above mentioned methods and modules in the present specification is able to be used when the present invention is operating in actual application. A number mentioned above or below in the present specification comprises the number itself. Additionally, if the present specification mentions that person A is electrically connected with or coupled to person B, which actually means that person A and person B have energy transmission behavior, data transmission behavior or signal transmission behavior, but is not limited to actually connect, whereby the transmission behaviors operated by electricity, light, or electromagnetic wave or other means etc. in wire or wireless way are all belong to its meaning.

Then, some methods or processes mentioned in the present specification are not limited to the order record in present specification, besides it is clear excluded in the present specification, otherwise the order of each step or process are arranged by the user according to their need for freely adjusting. Additionally, considering the features of each component are similar, so the explain and the symbol of each component with similar features are mutually applicable. In addition, the module, devices, components, or constituent parts etc. mentioned in the present specification is not limited to the hardware that are actually mutually independent, which may also be the individual software or individual firmware or the software or firmware after integration.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A light-emitting module, comprising:
  a power supply module;
  a first sub-circuit and a second sub-circuit, the first sub-circuit comprising a first light-emitting diode module, the second sub-circuit comprising a second light-emitting diode module and a passive component, wherein the passive component is a diode and connected with the second light-emitting diode module in series, and the maximum power dissipation of the diode is 500 mW, the lighting color of the first light-emitting diode module is different from the lighting color of the second light-emitting diode module; and
  a control module comprising a first pad, a second pad, a ground pad, and a power-supply pad, wherein the power supply module is coupled to the power-supply pad and the ground pad, the ground pad is coupled to a ground, the first sub-circuit is connected between the first pad and the power-supply pad and the second sub-circuit is connected between the second pad and the power-supply pad, the control module is configured to selectively connect the power supply module with the first sub-circuit and the second sub-circuit and drive the first light-emitting diode module and the second light-emitting diode module to emit light;

wherein the voltage drop of the first light-emitting diode module is between 2.8V and 3.2V, the voltage drop of the second light-emitting diode module is between 1.8V and 2.2V, the voltage drop of the first light-emitting diode module during lighting is greater than the voltage drop of the second light-emitting diode module during lighting, the first sub-circuit only includes the first light-emitting diode module and without the passive component, and the voltage drop of the first light-emitting diode module substantially matches the sum of the voltage drop of the second light-emitting diode module and the passive component connected with the second light-emitting diode module in series;

wherein outside of the control module, there is no transistor disposed between the first sub-circuit and the power-supply pad or between the first sub-circuit and the first pad, and there is no transistor disposed between the second sub-circuit and the power-supply pad or between the second sub-circuit and the second pad.

2. The light-emitting module of claim 1, further comprising:
a dynamic sensing module, coupled to the control module, the dynamic sensing module to be applied by an external force for generating a start signal so that the control module can drive the first light-emitting diode module and the second light-emitting diode module to emit light.

3. The light-emitting module of claim 1, further comprising:
a fourth sub-circuit, connected with the second sub-circuit in parallel and comprising a fourth light-emitting diode module and a passive component connected with the fourth light-emitting diode module in series, wherein the passive component connected with the second light-emitting diode module and the passive component connected with the fourth light-emitting diode module are a diode respectively.

4. The light-emitting module of claim 1, wherein the corresponding wavelength of the first light-emitting diode module is between 400 nm and 520 nm, the corresponding wavelength of the second light-emitting diode module is between 620 nm and 750 nm.

5. The light-emitting module of claim 1, wherein the power supply module is a lithium battery.

6. A light-emitting module, comprising:
a power supply module;
a first sub-circuit and a second sub-circuit, the first sub-circuit comprising a first light-emitting diode module, the second sub-circuit comprising a second light-emitting diode module, a fourth light-emitting diode module and a passive component, wherein the second light-emitting diode module and the fourth light-emitting diode module are connected with each other in parallel and then connected with the passive component in serial, a voltage drop of the second light-emitting diode module is substantially the same as a voltage drop of the fourth light-emitting diode module, the passive component is a diode, and the maximum power dissipation of the diode is 500 mW, the first sub-circuit only includes the first light-emitting diode module and without the passive component;
a control module comprising a first pad, a second pad, a ground pad, and a power-supply pad, wherein the power supply module is coupled to the power-supply pad and the ground pad, the ground pad is coupled to a ground, the first sub-circuit is connected between the first pad and the power-supply pad and the second sub-circuit is connected between the second pad and the power-supply pad, the control module is configured to selectively connect the power supply module with the first sub-circuit and the second sub-circuit and drive the first light-emitting diode module and the second light-emitting diode module to emit light; and a dynamic sensing module; coupled to the control module, the dynamic sensing module to be applied by an external force for generating a start signal so that the control module can drive the first light-emitting diode module and the second light-emitting diode module to emit light;

wherein one end of the first sub-circuit and one end of the second sub-circuit are respectively electrically connected with the control module, and the other end of the first sub-circuit is electrically connected with the other end of the second sub-circuit, the voltage drop of the first light-emitting diode module during lighting is greater than the voltage drop of the second light-emitting diode module during lighting, and the passive component is electrically connected with the control module, the second light-emitting diode module, and the fourth light-emitting diode module;

wherein the voltage drop of the first light-emitting diode module during supplying power on the first sub-circuit substantially matches the sum of the voltage drop of the second light-emitting diode module and the passive component connected with the second light-emitting diode module in series during supplying power on the second sub-circuit, and the voltage drop of the first light-emitting diode module during supplying power on the first sub-circuit substantially matches the sum of the voltage drop of the fourth light-emitting diode module and the passive component connected with the fourth light-emitting diode module in series during supplying power on the second sub-circuit, a difference value is defined between the voltage drop of the first sub-circuit and the voltage drop of the second sub-circuit, and the ratio between the difference value and the voltage drop of the first sub-circuit is smaller than 15%;

wherein the voltage drop of the first light-emitting diode module is between 2.8V and 3.2V, the voltage drop of the second light-emitting diode module is between 1.8V and 2.2V.

7. A light-emitting module, comprising:
a power supply module;
a first sub-circuit and a second sub-circuit, the first sub-circuit comprising a first light-emitting diode module, the second sub-circuit comprising a second light-emitting diode module and a passive component, wherein the passive component is a diode and connected with the second light-emitting diode module in series, the lighting color of the first light-emitting diode module is different from the lighting color of the second light-emitting diode module, the first sub-circuit only includes the first light-emitting diode module and without the passive component;
a control module comprising a first pad, a second pad, a ground pad, and a power-supply pad, wherein the power supply module is coupled to the power-supply pad and the ground pad, the ground pad is coupled to a ground, the first sub-circuit is connected between the first pad and the power-supply pad, and the second sub-circuit is connected between the second pad and the power-supply pad, the control module is configured to selectively supply the electrical power with the first sub-circuit and the second sub-circuit and drive the first light-emitting diode module and the second light-emitting diode module to emit light;

a dynamic sensing module; coupled to the control module, the dynamic sensing module to be applied by an external force for generating a start signal so that the control module can drive the first light-emitting diode module and the second light-emitting diode module to emit light;

wherein one end of the first sub-circuit and one end of the second sub-circuit are respectively electrically connected with the control module, the other end of the first sub-circuit is electrically connected with the other end of the second sub-circuit, one end of the power supply module is electrically connected with the control module, another end of the power supply module is electrically connected with one end of the dynamic sensing module and with a ground point, another end of the dynamic sensing module is electrically connected with the control module, the voltage drop of the first light-emitting diode module substantially matches the sum of the voltage drop of the second light-emitting diode module and the passive component connected with the second light-emitting diode module in series;

wherein outside of the control module, there is no transistor disposed between the first sub-circuit and the power-supply pad or between the first sub-circuit and the first pad, and there is no transistor disposed between the second sub-circuit and the power-supply pad or between the second sub-circuit and the second pad.

* * * * *